United States Patent

[11] 3,597,095

[72] Inventor Yoshio Fukushima
 Tokyo, Japan
[21] Appl. No. 639,521
[22] Filed May 18, 1967
[45] Patented Aug. 3, 1971
[73] Assignee Kabushiki Kaisha Ricoh
 Tokyo, Japan
[32] Priority June 15, 1966
[33] Japan
[31] 41/38223

[54] PHOTOGRAPHIC EXPOSURE METER
 7 Claims, 2 Drawing Figs.
[52] U.S. Cl. .................................... 356/226,
 95/10 C, 250/214, 340/228, 356/227, 356/231
[51] Int. Cl. .................................... G01j 1/44
[50] Field of Search .......................... 356/204–
 –206, 218–232; 250/210, 214; 95/10; 340/200, 228

[56] References Cited
FOREIGN PATENTS
454,605 6/1968 Switzerland ................. 356/226
OTHER REFERENCES
Hennig, " Electronic Circuits With Photocells" (in German), Funkschau, No. 19, 1964, p. 519

Primary Examiner—Ronald L. Wibert
Assistant Examiner—R. J. Webster
Attorney—Burgess, Ryan and Hicks ABSTRACT: A photographic exposure material wherein the pilot lamps are utilized in conjunction with the amplifiers and whereby the proper exposure is obtained by comparing the brightness of one of the pilot lamps with the brightness of the other pilot lamp.

Patented Aug. 3, 1971 3,597,095

INVENTOR
BY Yoshio Fukushima
Burgess, Ryan & Hicks
Attys.

PHOTOGRAPHIC EXPOSURE METER

This invention relates to an improvement of a photographic exposure meter wherein two pilot lamps are used and proper exposure is obtained by comparing the brightness of both lamps with each other.

In the conventional exposure meter, a resistor with relatively high resistance as compared with that of a photoelectric element is connected in series with the control circuit of an amplifier element and when incident light from a subject is weak, as in the case when the light value is 3 (LV3), the conventional exposure meter is not operable with a power source of 1.3 volt, for example. In other words, although it is desirable that parts be made as small as possible in an apparatus with limited size such as a camera, an exposure meter as heretofore known does not operate well with a source of power comprising only one dry cell. Instead two or more cells are needed.

Furthermore, convention exposure meters suffer from the characteristic that the brightness of the pilot lamps get remarkably poor at low temperatures. As a result the amplification of the amplifiers drops and the pilot lamps get too dark to be utilized. Even if the circuit constant is so determined that the pilot lamps are not put out, it is inevitable that the brightness of the lamps will be greatly affected by temperature change.

Therefore, it is an object of the present invention to provide a photographic exposure meter which can be operated by a small source of power.

It is another object of the present invention to provide a photographic exposure meter which is not significantly affected by the change of temperature.

Still other objects and advantages of the present invention will become readily apparent to those skilled in the art from the following description with reference to the drawings in which.

Figure 1:
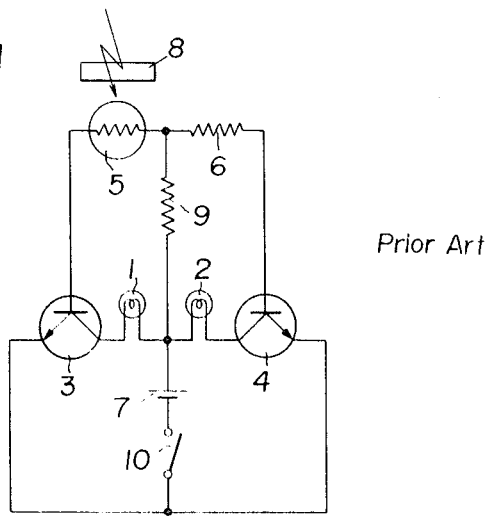
FIG. 1 shows the conventional electric circuit of a photographic exposure meter using two pilot lamps.

In FIG. 1 reference numerals 1 and 2 designate main and auxiliary pilot lamps, respectively, and reference numerals 3 and 4 designate amplifier elements such as transistors. Reference numeral 5 designates a photoelectric element such as CdS, reference numeral 6 designates a resistor, reference numeral 7 designates a direct current power source such as a mercury cell, reference numeral 8 designates a regulation unit for controlling the incident light energy such as an iris or a filter, reference numeral 9 designates the direct current resistor of a control circuit for the amplifier elements 3 and 4 and reference numeral 10 designates a switch.

The exposure meter shown in FIG. 1 is initially adjusted so that the brightness of the pilot lamp 2 gets to a proper value upon closing the switch 10. When the switch 10 is closed and the meter is directed to the subject matter, the photoelectric element 5 has a certain resistance in response to the intensity of the incident light from the subject matter, and then the main pilot lamp 1 has a certain brightness in response to the resistance of the photoelectric element 5. The brightness of the main pilot lamp 1 can be made equal to that of the auxiliary pilot lamp 2 by controlling the regulation unit 8. If the indicator of the unit 8 is set so as to show the proper exposure when the brightnesses of the both lamps get to the same value, the proper exposure can be obtained by reading the indicator. Furthermore, the regulation unit 8 may be engaged with the exposure control device for a camera.

In the above-mentioned circuit, the resistance of the direct current resistor 9, which is inserted in a place common to the control circuits of both amplifier elements, has to be high relative to the resistance of the photoelectric element 5 and hence the proper operation of the circuit cannot be accomplished in the case of a weak incident light such as LV3. If the regulation unit 8 is so controlled that both pilot lamps are simultaneously turned on in room temperature both lamps will be put out due to a reduction in the amplification of both amplifier elements when the temperature is low. This occurs because when the brightness of one pilot lamp increases by the operation of the unit 8, the brightness of the other pilot lamp gets lower; and the rates of change of brightness are in the same order so that it never happens that the change in one pilot lamp is amplified to affect the other. Thus, the electric currents through both pilot lamps are affected and decreased in the same degree by temperature fall.

Figure 2:
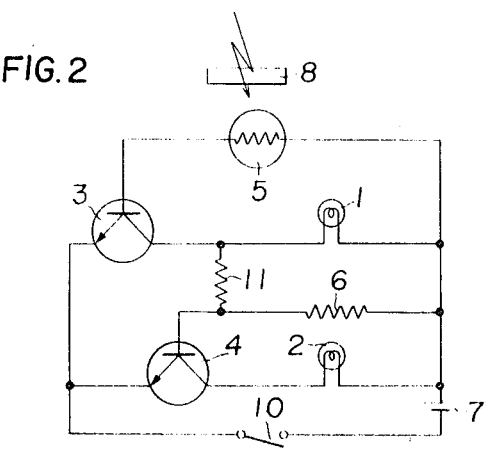
FIG. 2 shows the electric circuit of the device of the present invention.

In FIG. 2, which shows one embodiment of the present invention, the same reference numerals designate the same parts as in FIG. 1 and reference numeral 11 designates a resistor inserted between the load circuit of the amplifier element 3 for the main pilot lamp 1 and the control grid of the amplifier element 4 for the auxiliary pilot lamp 2.

When the switch 10 is closed and the incident light enters the photoelectric element 5 through the regulation unit 8 from the subject matter, the main pilot lamp 1 becomes luminous with a brightness which depends on the then resistance of the photoelectric element 5 and the pilot lamp 2 is lighted to a certain brightness. This device is previously adjusted so as to indicate a proper exposure when the brightness of both pilot lamps are equal. If the brightness of the main pilot lamp 1 is different from that of the auxiliary pilot lamp 2, for instance if the former is lower than the latter, by opening the iris of the regulation unit 8 the brightness of both lamps can be made equal. This is because the resistance of the photoelectric element 5 is decreased, so the control current of the amplifier element 3 is increased. Load current is increased, and the brightness of the main pilot lamp 1 is increased. The brightness of the auxiliary pilot lamp 2 is thus decreased for the reasons hereinafter described.

In the above-mentioned case, the reason why the load current of the amplifier element 3 is increased so that the main pilot lamp 1 becomes brighter, is the reduction of the resistance between the anode and cathode of the amplifier element 3. As a result the resistance of the circuit comprising the anode of the power source 7, the resistors 6 and 11, the amplifier element 3, the switch 10 and the cathode of the power source 7, is reduced and the current through the circuit is increased so that the voltage drop due to the resistor 6 is increased, the control current of the amplifier element 4 is reduced and the current through the load circuit of the amplifier element 4 is decreased. Accordingly, the brightness of the auxiliary pilot lamp 2 is changed in the opposite direction to that of the main pilot lamp 1 and the conducting state of the amplifier 3 enables the conducting state of amplifier 4 to be controlled.

If the incident light is too strong and the brightness of the main pilot lamp 1 is higher than that of the auxiliary pilot lamp 2, the operation is just opposite to the above-mentioned case and the result the same.

The resistor 11 plays a very important part in regulating the degree of change in the brightnesses of the both pilot lamps.

In the device of the present invention it is not necessary to put a direct current resistor with high resistance in the control circuit of each amplifier element, and hence even in the case of the dark subject matter such as LV3 the device can be operated sufficiently by a power source of 1.3 volt, for example, and the present invention is very advantageous for a camera the parts of which have to be small-sized.

Furthermore, even if the amplification of the amplifier element 3 is so reduced that the pilot lamp 1 is put out due to low temperature, the control current of the amplifier element 4 is greatly affected by the voltage between the anode and cathode of the amplifier element 3 and the brightnesses of both pilot lamps change in opposite direction with respect to each other and hence the put-out state of the main pilot lamp 1 automatically causes the put-on state of the auxiliary pilot lamp 2. Accordingly, in spite of the reduction of the amplification of both amplifier elements, the device of the present invention can be set so that both lamps are kept in the put-on state by adjusting the regulation unit 8. On the device shown in FIG. 2, the change of input of the amplifier element 4 is affected by the amplified change of input of the amplifier element 3 while in the case of FIG. 1, the change of the former is affected by the change itself (not amplified) of the latter. Explaining the reason in more detail, in FIG. 2 the small change of the input of the main pilot lamp 1, in other words, the small change of the brightness of the pilot lamp 1 can cause the large change of input of the amplifier element 4, and even if the amplification of the amplifier element 4 is reduced, the auxiliary pilot lamp 2 can be kept in about the same brightness as the main pilot lamp 1 only by the small reduction of the brightness of the main pilot lamp 1. Therefore, the device of the present invention can be used even in low temperature.

Moreover, in the present invention, the input of the amplifier element 4 is an amplified input of the amplifier element 3, and hence the relative change of brightness between the pilot lamps 1 and 2 is larger than the change in the case of FIG. 1 and the proper exposure can be easily obtained.

Since modifications of the invention will be apparent to those skilled in the art, it is intended that the scope of the invention as claimed include numerous modifications and variations not specifically described herein.

What I claim is:

1. An exposure meter for a photographic camera for connection to a power source, comprising:
    a first amplifier circuit having at least a control terminal and a load terminal;
    a main pilot lamp connected as a load with respect to said first amplifier circuit;
    a photoelectric element connected with the control terminal of said first amplifier circuit;
    means connecting the load terminal of said first amplifier circuit to the control terminal of said second amplifier circuit;
    whereby the magnitude of the brightness of said main pilot lamp and the magnitude of the brightness of said auxiliary pilot lamp change in the opposite direction with respect to each other in response to a change of resistance of said photoelectric element.

2. An exposure meter for a camera as set froth in claim 1, wherein said connecting means include a resistor connecting together said load terminal of said first amplifier circuit and said control terminal of said second amplifier circuit.

3. An exposure meter for a photographic camera for connection to a power source wherein said exposure meter comprises:
    a first amplifier having at least a control terminal and a load terminal;
    photoelectric means operatively connected with said first amplifier and with the control terminal thereof for controlling the conductive state of said first amplifier;
    a first pilot lamp operatively coupled with the load terminal of said first amplifier to be lighted in accordance with current passing through said first amplifier;
    at least a second amplifier having at least a load terminal and a control terminal wherein the control terminal of said second amplifier is operatively coupled with the load terminal of said first amplifier to enable the conducting state of said first amplifier to control the conducting state of said second amplifier;
    means for permitting connection of said amplifier and said power source; and
    a second pilot lamp operatively coupled to the load terminal of said second amplifier to be lighted in accordance with current passing through said second amplifier, and wherein said second amplifier is operatively coupled with said first amplifier in parallel relationship to enable the conducting states of said amplifiers to vary in predetermined relationship with respect to one another.

4. An exposure meter as in claim 3 further including a first resistor connecting the control terminal of said second amplifier to the load terminal of said first amplifier.

5. An exposure meter as in claim 4 further including a second resistor connected to said first resistor and to the control terminal of said second amplifier and for connecting to said power source.

6. A photoelectric metering device for use with a source of electric potential, comprising: impinging photoresistor means for varying its resistance in accordance with light impinging thereon;
    means for coupling said photoresistor means to said source of electric potential;
    a first semiconductor amplifier means coupled to said photoresistor means and having a first output;
    a first indicator means operatively connected to said output for actuation in dependency on the intensity of light illuminating said photoresistor means;
    a second semiconductor amplifier means having a control terminal and a second output and having second indicator means coupled to said second output, said second amplifier means being in parallel circuit with said first amplifier means; and
    means for coupling said control terminal and second indicator means to said first output of said first amplifier means and to said source of electric potential for enabling actuation of said second indicator means in inverse relation to the indication of said first indicator means.

7. A photoelectric exposure metering device as in claim 6 wherein said second amplifier coupling means includes resistor means connected between the said first output of said first amplifier means and the input of said second amplifier means for controlling the second amplifier means in accordance with the output of the first amplifier means.

UNITED STATES PATENT OFFICE
CERTIFICATE OF CORRECTION

Patent No. 3,597,095     Dated August 3, 1971

Inventor(s) Yoshio Fukushima

It is certified that error appears in the above-identified patent and that said Letters Patent are hereby corrected as shown below:

Column 3, between lines 31 and 32, insert the following:

-- a second amplifier circuit having at least a control terminal;

an auxiliary pilot lamp connected as a load to said second amplifier circuit, said first and second amplifier circuits connected in parallel with each other and for connection to said power source; and --;

Column 3, line 40, change "froth" to -- forth --;

Column 4, line 26, delete "impinging".

Signed and sealed this 25th day of April 1972.

(SEAL)
Attest:

EDWARD M. FLETCHER, JR.
Attesting Officer

ROBERT GOTTSCHALK
Commissioner of Patents

Case 1753-23